United States Patent
Yoshino

(10) Patent No.: US 8,570,021 B2
(45) Date of Patent: Oct. 29, 2013

(54) DC/DC CONVERTER HAVING A DELAY GENERATOR CIRCUIT POSITIONED BETWEEN A COMPARATOR AND A PULSE GENERATOR AND A DC/DC CONVERTER CONTROL METHOD

(75) Inventor: Takahiro Yoshino, Kasugai (JP)

(73) Assignee: Spansion LLC, Sunnyvale, CA (US)

( * ) Notice: Subject to any disclaimer, the term of this patent is extended or adjusted under 35 U.S.C. 154(b) by 513 days.

(21) Appl. No.: 12/815,126

(22) Filed: Jun. 14, 2010

(65) Prior Publication Data

US 2010/0320991 A1 Dec. 23, 2010

(30) Foreign Application Priority Data

Jun. 18, 2009 (JP) .................................. 2009-145541

(51) Int. Cl.
*G05F 1/00* (2006.01)
(52) U.S. Cl.
USPC .......................................... 323/288; 323/283
(58) Field of Classification Search
USPC ......................................... 323/282, 283, 288
See application file for complete search history.

(56) References Cited

U.S. PATENT DOCUMENTS

| 5,770,490 A | 6/1998 | Frenette et al. | |
|---|---|---|---|
| 5,854,564 A * | 12/1998 | Darmawaskita et al. | ........ 327/78 |
| 2006/0290333 A1 * | 12/2006 | Fukushi et al. | ............... 323/277 |
| 2009/0174384 A1 * | 7/2009 | Michishita et al. | ........... 323/285 |
| 2009/0218999 A1 * | 9/2009 | Kikuchi | ........................ 323/282 |

FOREIGN PATENT DOCUMENTS

JP 2008-029159 A 2/2008

* cited by examiner

*Primary Examiner* — Adolf Berhane
*Assistant Examiner* — Emily Pham
(74) *Attorney, Agent, or Firm* — Sterne, Kessler, Goldstein & Fox P.L.L.C.

(57) ABSTRACT

A DC/DC converter includes a first comparator configured to compare an output voltage to a reference voltage; a pulse generator circuit configured to generate a pulse signal when triggered by an output signal from the first comparator; a first switch circuit configured to open and close on the basis of the pulse signal; an output voltage generator configured to generate the output voltage on the basis of an input voltage supplied via the first switch circuit; a delay generator circuit configured to delay the output signal from the first comparator before outputting; and an error amplifier configured to control a delay time of the delay generator circuit on the basis of a potential difference between the output voltage and the reference voltage.

9 Claims, 11 Drawing Sheets

Related Art

Related Art

Related Art

US 8,570,021 B2

DC/DC CONVERTER HAVING A DELAY GENERATOR CIRCUIT POSITIONED BETWEEN A COMPARATOR AND A PULSE GENERATOR AND A DC/DC CONVERTER CONTROL METHOD

CROSS-REFERENCE TO RELATED APPLICATION

This application is based upon and claims the benefit of priority of the prior Japanese Patent Application No. 2009-145541, filed on Jun. 18, 2009, the entire contents of which are incorporated herein by reference.

FIELD

Aspects discussed herein relate to a DC/DC converter and a DC/DC converter control method.

BACKGROUND

FIG. 9 illustrates a constant on-time DC/DC converter. A direct-current input voltage Vin, which is supplied from a battery or similar source, is supplied to one end of a coil 2 via a switch circuit 1. One end of the coil 2 is connected to the cathode of a diode 3, while the anode of the diode 3 is connected to ground GND.

The other end of the coil 2 is connected to ground GND via a capacitor 4. An output voltage Vout is then output on the basis of the switching control of the switch circuit 1.

FIG. 10 is a timing waveform diagram illustrating the operation of a DC/DC converter. The output voltage Vout is input into the minus-side input terminal of a comparator 5, while a reference voltage Vref is input into the plus-side input terminal of the comparator 5. The output signal from the comparator 5 is output to a mono multivibrator circuit (MM) 6, and the switching of the switch circuit 1 is controlled by the output signal Vmm from the mono multivibrator circuit 6.

When the output voltage Vout goes lower than the reference voltage Vref, the comparator 5 outputs an H-level signal. When the output voltage Vout goes higher than the reference voltage Vref, the comparator 5 outputs an L-level signal. The mono multivibrator circuit 6 outputs an output signal that is H-level for a fixed amount of time when triggered by the rising of the output signal from the comparator 5.

When the output voltage Vout falls to or below the level of the reference voltage Vref, the output signal Vmm from the mono multivibrator circuit 6 rises to H-level, the switch circuit 1 enters a conducting state, and the output voltage Vout rises.

Once a fixed amount of time has elapsed since the rising of the output signal Vmm from the mono multivibrator circuit 6, Vmm goes to L-level. At this point, the switch circuit 1 becomes non-conducting, and supply of the input voltage Vin is cut off, which causes the output voltage Vout to fall. Once the output voltage Vout has fallen to the reference voltage Vref, the above operation is repeated. In this way, the generated output voltage Vout is smoothed by an output smoothing capacitor, and an average value Vave is supplied to an external device as power.

However, in a DC/DC converter like the above, fluctuations in the input voltage Vin fluctuates will cause the ripple (i.e., the slope of the rise and the wave height value) to change in the output voltage Vout, which causes fluctuations in the average value Vave supplied to the external device.

FIG. 11 illustrates another constant on-time DC/DC converter (U.S. Pat. No. 5,770,940). The output voltage Ve from an error amplifier 7 is input into the plus-side input terminal of a comparator 5. The output voltage Vout is input into the minus-side input terminal of the error amplifier 7 via a resistor, while a reference voltage Vref is input into the plus-side input terminal.

The error amplifier 7 operates so as to lower the output voltage Ve when the output voltage Vout goes higher than the reference voltage Vref, and to raise the output voltage Ve when the output voltage Vout goes lower than the reference voltage Vref. If the output voltage Vout rises, the rise timing of the output signal from the comparator 5 occurs later. If the output voltage Vout lowers, the rise timing of the output signal from the comparator 5 occurs earlier.

As a result, the above DC/DC converter operates such that the average value Vave of the output voltage Vout converges on the reference voltage Vref, and the fluctuations in the average value Vave due to fluctuations in the input voltage Vin are suppressed.

SUMMARY

According to an aspect of the invention, a DC/DC converter includes a first comparator configured to compare an output voltage to a reference voltage; a pulse generator circuit configured to generate a pulse signal when triggered by the output signal from the first comparator, a first switch circuit configured to open and close on the basis of the pulse signal, an output voltage generator configured to generate the output voltage on the basis of an input voltage supplied via the first switch circuit, a delay generator circuit configured to delay the output signal from the first comparator before outputting, and an error amplifier configured to control the delay time of the delay generator circuit on the basis of the potential difference between the output voltage and the reference voltage.

According to another aspect of the invention, a DC/DC converter control method includes generating a pulse signal when triggered by a comparison result obtained by comparing an output voltage to a reference voltage, opening or closing a switch circuit on the basis of the pulse signal, and generating the output voltage on the basis of an input voltage supplied via the switch circuit, wherein the pulse signal is generated using a delay signal that delays the comparison result on the basis of the potential difference between the output voltage and the reference voltage.

Additional advantages and novel features of aspects of the present invention will be set forth in part in the description that follows, and in part will become more apparent to those skilled in the art upon examination of the following or upon learning by practice thereof.

DETAILED DESCRIPTION

Exemplary Implementation 1

Figure 1:
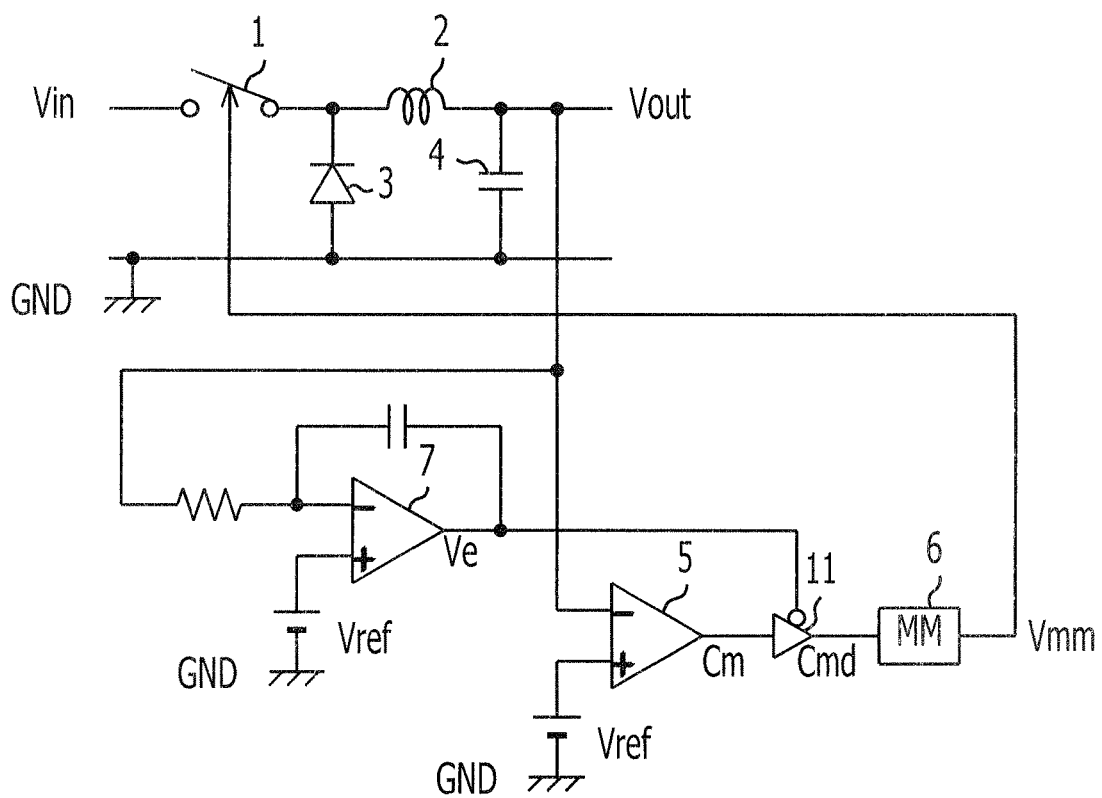
FIG. 1 is a circuit diagram illustrating an exemplary DC/DC converter in a first exemplary implementation in accordance with aspects of the present embodiment.

FIG. 1 illustrates an exemplary constant on-time DC/DC converter.

A direct-current input voltage Vin, which is supplied from a battery or similar source, is supplied to one end of a coil 2 via a switch circuit 1 (a first switch circuit). One end of the coil 2 is connected to the cathode of a diode 3, while the anode of the diode 3 is connected to ground GND.

Figure 5:
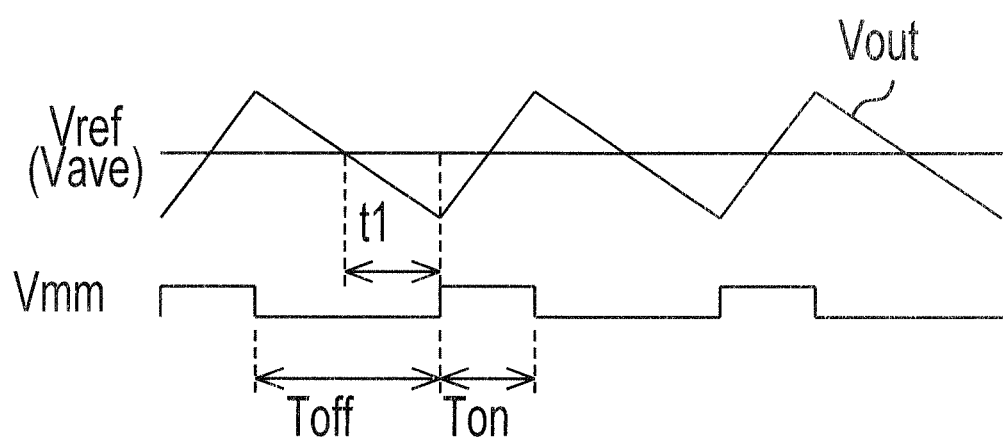
FIG. 5 is a timing waveform diagram illustrating the operation of an exemplary DC/DC converter in a first exemplary implementation in accordance with aspects of the present embodiment.

The other end of the coil 2 is connected to ground GND via a capacitor 4. An output voltage Vout is then output on the basis of the switching control of the switch circuit 1. FIG. 5 is a timing waveform diagram illustrating the operation of a DC/DC converter in the first exemplary implementation.

The output voltage Vout is input into the minus-side input terminal of a comparator 5 (a first comparator), while a reference voltage Vref is input into the plus-side input terminal of the comparator 5. The output signal Cm from the comparator 5 is delayed by a delay generator circuit 11, and output to a mono multivibrator circuit (i.e., a pulse generator circuit) 6, and the switching of the switch circuit 1 is controlled by the output signal (i.e., pulse signal) Vmm from the mono multivibrator circuit 6.

When the output voltage Vout goes lower than the reference voltage Vref, the comparator 5 outputs the output signal Cm at H-level. When the output voltage Vout goes higher than the reference voltage Vref, the comparator 5 outputs the output signal Cm at L-level. The mono multivibrator circuit 6 outputs an output signal Vmm that is H-level for a fixed amount of time when triggered by the rising of the output signal Cmd from the delay generator circuit 11.

The output voltage Ve from an error amplifier 7 is input into the delay generator circuit 11, and the delay time is controlled on the basis of the output voltage Ve. The output voltage Vout is input into minus-side input terminal of the error amplifier 7 via a resistor, while the reference voltage Vref is input into the plus-side input terminal. The reference voltage Vref may be nearly the same voltage as the reference voltage Vref input into the comparator 5, but is not limited thereto.

The error amplifier 7 operates so as to lower the output voltage Ve when the output voltage Vout goes higher than the reference voltage Vref, and to raise the output voltage Ve when the output voltage Vout goes lower than the reference voltage Vref.

Figure 2:
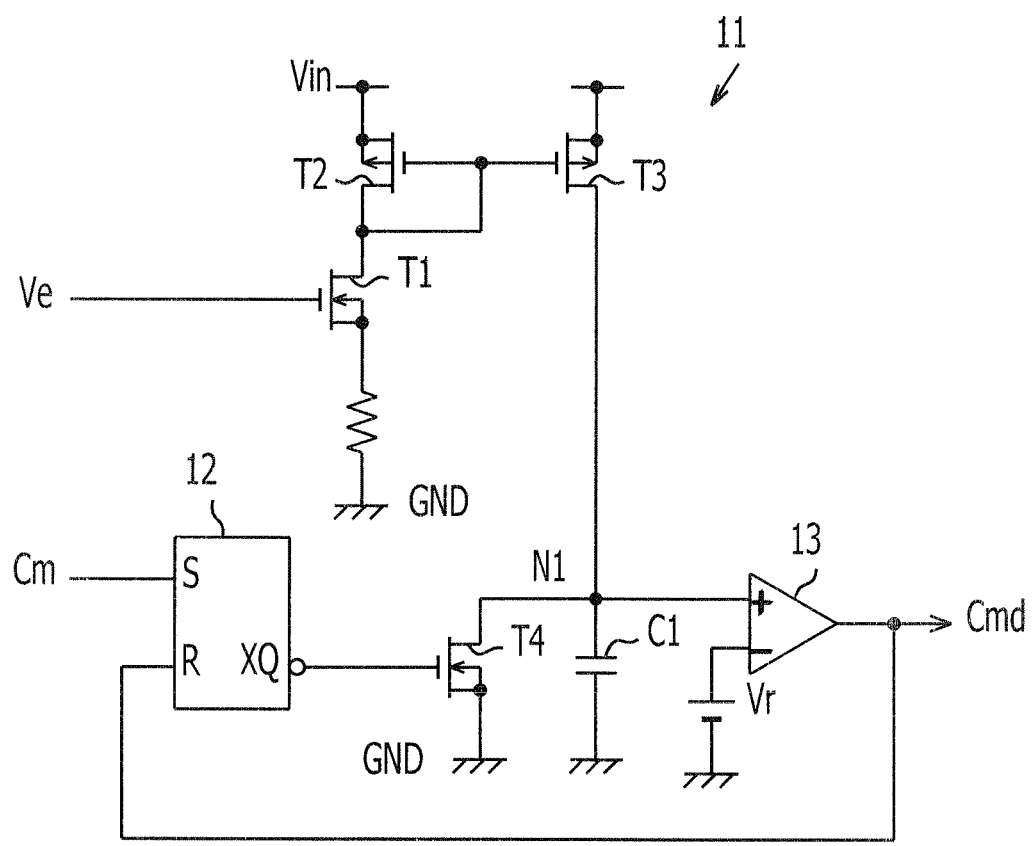
FIG. 2 is a circuit diagram illustrating an exemplary delay generator circuit in a first exemplary implementation in accordance with aspects of the present embodiment.

A detailed configuration of the delay generator circuit 11 will now be described in accordance with FIG. 2. The output voltage Ve from the error amplifier 7 is input into the gate of a transistor T1, while the drain of the transistor T1 is connected to the drain and the gate of a transistor T2. The source of the transistor T1 is connected to ground GND via a resistor.

The transistor T1 may be an n-channel MOS transistor, for example. The transistor T2 may be a p-channel MOS transistor, for example.

The input voltage Vin is supplied to the source of the transistor T2 as power. The gate of the transistor T2 is connected to the gate of a MOS transistor T3. The input voltage Vin is supplied to the source of the transistor T3. Consequently, the transistors T2 and T3 act as a current mirror. The transistor T3 may be a p-channel MOS transistor, for example.

The drain of the transistor T3 is connected to a node N1, which forms one end of a capacitor (a delay-setting unit) C1. The other end of the capacitor C1 is connected to ground GND.

Connected to the node N1 is the drain of a transistor (a second switch circuit) T4. The source of the transistor T4 is connected to ground GND. The transistor T4 is formed to be significantly larger in size than the transistor T3. The transistor T4 may be an n-channel MOS transistor, for example.

In addition, the output signal XQ from a flip-flop circuit 12 is input into the gate of the transistor T4.

Figure 4:
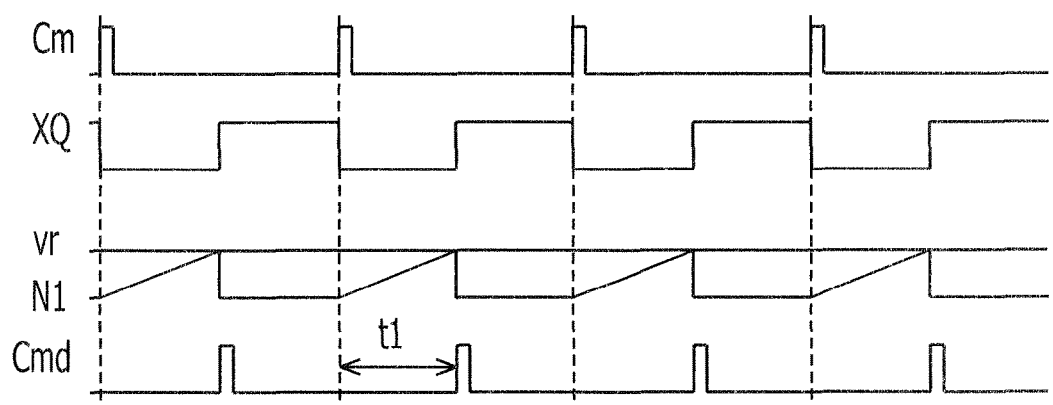
FIG. 4 is a timing waveform diagram illustrating the operation of an exemplary delay generator circuit in accordance with aspects of the present embodiment.

FIG. 4 is a timing waveform diagram illustrating the operation of the delay generator circuit 11. The output signal Cm from the comparator 5 is input into the set terminal S of the flip-flop circuit 12. When the output signal Cm rises to H-level, the output signal XQ goes to L-level.

The node N1 is connected to the plus-side input terminal of a comparator 13 (a second comparator). A reference voltage Vr is input into the minus-side input terminal of the comparator 13. The comparator 13 outputs the output signal Cmd at H-level when the potential at the node N1 (or in other words, the charging voltage of the capacitor C1) exceeds the reference voltage Vr.

The output signal Cmd from the comparator 13 is input into the reset terminal R of the flip-flop circuit 12. In the flip-flop circuit 12, the output signal XQ goes to L-level when the set terminal S is at H-level, and the output signal XQ goes to H-level when the reset terminal R is at H-level.

In the delay generator circuit 11, the transistor T1 is switched on when the output voltage Ve from the error amplifier 7 is equal to or greater than a threshold value in the transistor T1, and a drain current flows into the transistors T2 and T3. As the voltage of the output voltage Ve from the error amplifier 7 rises, the drain current from the transistors T2 and T3 increases. The capacitor C1 charged by the drain current from the transistor T3, and the potential at the node N1 rises.

When the output signal Cmd from the comparator 13 in the delay generator circuit 11 goes to H-level, the output signal XQ from the flip-flop circuit 12 is reset to H-level, and the transistor T4 is switched on. This causes the accumulated charge in the capacitor C1 to be absorbed, and the potential at the node N1 becomes nearly equal to ground GND. This causes the output signal Cmd from the comparator 13 to go to L-level.

In this state, when the output signal Cm from the comparator 5 goes to H-level, the output signal XQ from the flip-flop circuit 12 goes to L-level, and the transistor T4 is switched off.

This causes the capacitor C1 to be charged by the drain current from the transistor T3, and the potential at the node N1 rises. When the potential at the node N1 goes higher than the reference voltage Vr, the output signal Cmd from the comparator 13 goes to H-level, the output signal XQ from the flip-flop circuit 12 goes to H-level, and the above operation is repeated.

Consequently, in the delay generator circuit 11, a rising output signal Cmd is generated and output after a delay time t1 elapsing since the rising of the output signal Cm from the comparator 5. This delay time t1 is controlled by the output voltage Ve from the error amplifier 7.

Figure 3:
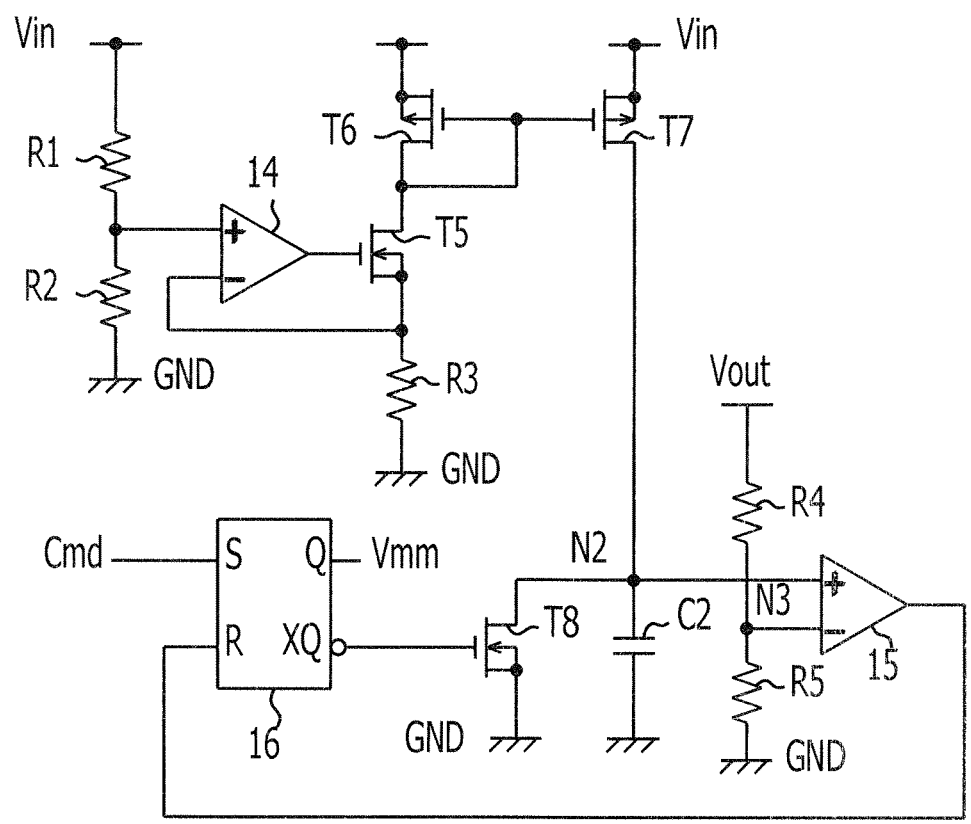
FIG. 3 is a circuit diagram illustrating an exemplary mono multivibrator circuit in a first exemplary implementation in accordance with aspects of the present embodiment.

FIG. 3 is a circuit diagram illustrating the mono multivibrator circuit 6 in the first exemplary implementation. The input voltage Vin is divided by resistors R1 and R2, and input into the plus-side input terminal of an amplifier 14. The output signal from the amplifier 14 is input into the gate of a transistor T5. The source of the transistor T5 is connected to the minus-side input terminal of the amplifier 14, while also being connected to ground GND via a resistor R3. The transistor T5 may be a n-channel MOS transistor, for example.

The drain of the transistor T5 is connected to the drain and the gate of a transistor T6. The input voltage Vin is supplied to the source of the transistor T6. When the input voltage Vin falls, the output voltage from the amplifier 14 falls, the drain current from the transistor T5 decreases, and the source potential of the transistor T5 falls. Consequently, the amplifier 14 keeps pace with fluctuations in the input voltage Vin, adjusting the drain current of the transistor T5 such that the voltage at both input terminals may become substantially the same. The transistor T6 may be a p-channel MOS transistor, for example.

The gate of the transistor T6 is connected to the gate of a transistor T7. The input voltage Vin is input into the source of the transistor T7. The transistors T6 and T7 act as a current mirror. The transistor T7 may be a p-channel MOS transistor, for example.

The drain of the transistor T7 is connected to a node N2, which forms one end of a capacitor C2. The other end of the capacitor C2 is connected to ground GND. The node N2 inputs into the plus-side input terminal of a comparator 15, and is connected to ground GND via a transistor T8. The transistor T8 is formed to be significantly larger in size than the transistor T7. The transistor T8 may be an n-channel MOS transistor, for example.

Input into the minus-side input terminal of the comparator 15 is the potential of a node N3. This potential comes from the output voltage Vout being divided by resistors R4 and R5. The output signal from the comparator 15 is input into the reset terminal R of a flip-flop circuit 16.

The output signal Cmd from the delay generator circuit 11 is input into the set terminal S of the flip-flop circuit 16. The output voltage Vmm is output from the output terminal Q of the flip-flop circuit 16. An inversion of the output signal Vmm from the flip-flop circuit 16 is output to the gate of the transistor T8.

In the mono multivibrator circuit 6, the output signal Vmm rises to H-level when the output signal Cm from the delay generator circuit 11 goes to H-level. At this point, the output signal XQ from the flip-flop circuit 16 goes to L-level, and the transistor T8 is switched off.

In so doing, the capacitor C2 is charged by the drain current from the transistor T7, and the potential at the node N2 rises. When the potential at the node N2 goes higher than the potential at the node N3, the output signal from the comparator 15 goes to H-level. The output signal Vmm from the flip-flop circuit 16 then goes to L-level on the basis of the H-level output signal from the comparator 15. An H-level output signal XQ from the flip-flop circuit 16 is then output, which switches on the transistor T8, and the potential at the node N2 goes to approximately ground GND-level.

Consequently, an output signal Vmm is output at H-level for a set amount of time lasting from the rising of the output signal Cmd from the delay generator circuit 11 until the potential at the node N2 exceeds the potential at the node N3 due to the charging operation of the capacitor C2.

If the input voltage Vin rises, then the drain current from the transistors T5 to T7 increases, and potential at the node N2 rises more quickly. As a result, the timing at which the output signal from the comparator 15 goes to H-level occurs earlier. If the output voltage Vout rises, then the potential at the node N3 rises. As a result, the timing at which the output signal from the comparator 15 goes to H-level occurs later.

In the case where both the input voltage Vin and the output voltage Vout rise, or in the case where both the input voltage Vin and the output voltage Vout fall, the changes in the input voltage Vin and the output voltage Vout cancel each other out, and it becomes possible to keep the pulse width at which the output signal Vmm goes to H-level constant.

FIG. 5 is a timing waveform diagram illustrating the operation of the DC/DC converter in the first exemplary implementation. When the output signal Vmm from the mono multivibrator circuit 6 goes to H-level, the switch circuit 1 enters a conducting state, and the potential of the output voltage Vout rises. In contrast, when the output signal Vmm from the mono multivibrator circuit 6 goes to I-level, the switch circuit 1 enters a non-conducting state, and the potential of the output voltage Vout falls.

The output signal Vmm from the mono multivibrator circuit 6 rises to H-level after a delay time t1 set by the delay generator circuit 11 that begins to elapse once the output signal Cm from the comparator 5 goes to H-level. As a result, the switch circuit 1 changes to a conducting state after the output voltage Vout has fallen below the reference voltage Vref. In steady state, the delay time t1 becomes ½ of the time Toff during which the switch circuit 1 is non-conducting, and the average value Vave of the output voltage Vout becomes substantially the same as the reference voltage Vref.

If Ts is taken to be the target value of the switching period for the switch circuit 1, then the time Ton during which the output signal Vmm from the mono multivibrator circuit 6 is at H-level becomes Ton=Vout/Vin*Ts due to the mono multivibrator circuit 6 illustrated in FIG. 3, and the input/output voltage dependence is almost entirely eliminated.

At this point, time Toff during which the output signal Vmm from the mono multivibrator circuit 6 is at L-level becomes Toff=(Vin−Vout)/Vin*Ts, with Toff being set to the maximum value of the delay time t1.

According to aspects of the first exemplary implementation, the following advantages can be obtained. (1) The output voltage Vout and the reference voltage Vref are compared by the comparator 5, and on the basis of the output signal from the comparator 5, the switching of the switch circuit 1 is controlled. For this reason, the load response speed can be improved. (2) The output voltage Vout can be controlled with high precision on the basis of the output voltage Ve from the error amplifier 7. (3) The output signal Cm from the comparator 5 is delayed by the delay generator circuit 11 and then supplied to the mono multivibrator circuit 6, thereby making it possible to delay the timing at which the switch circuit 1 becomes conducting. Consequently, the average value Vave of the output voltage Vout can be controlled to match the reference voltage Vref. (4) Since the delay time t1 generated by the delay generator circuit 11 is controlled by the output voltage Ve from the error amplifier 7, the output voltage Vout can be controlled with high precision.

Exemplary Implementation 2

Figure 6:
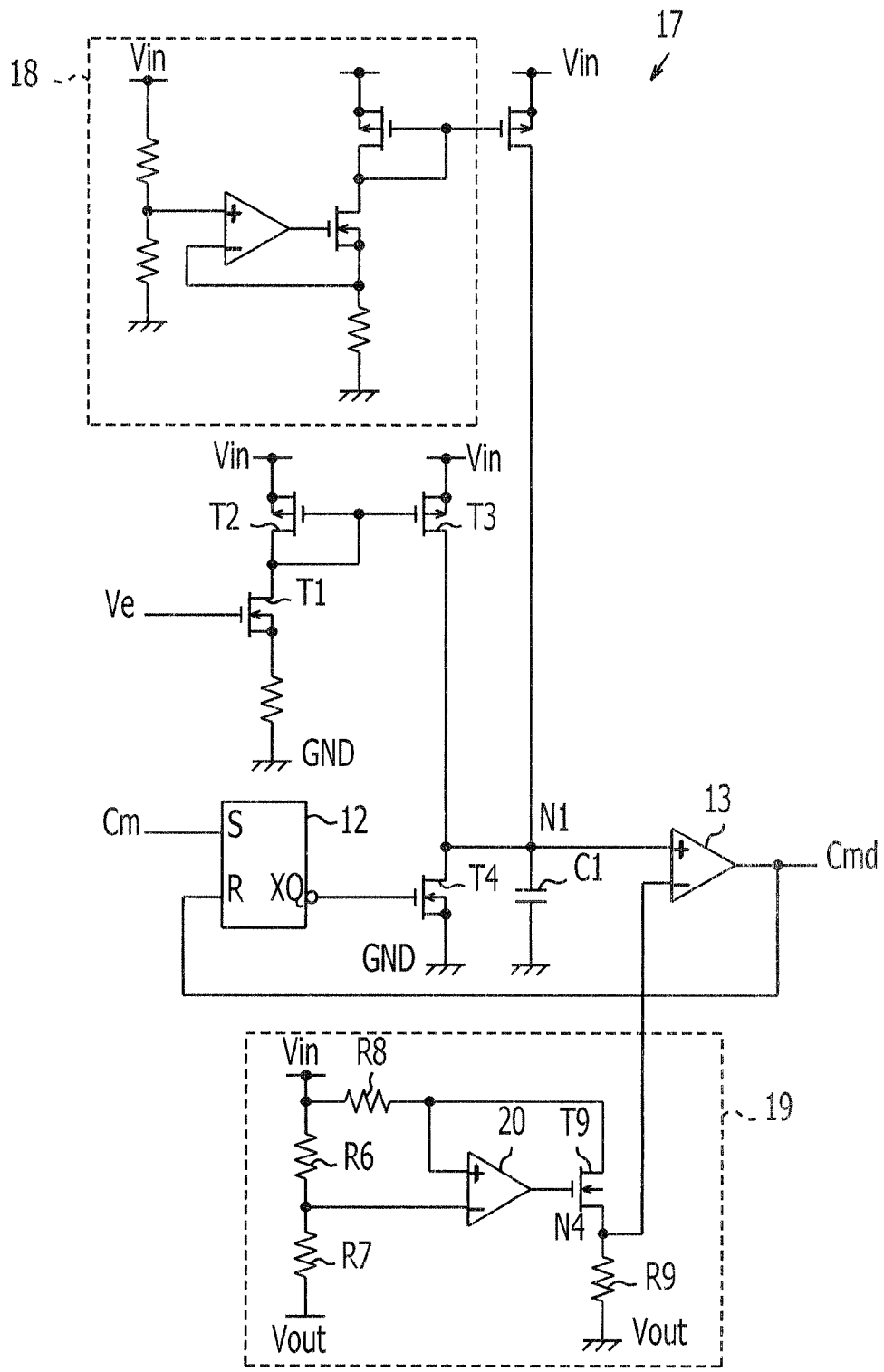
FIG. 6 is a circuit diagram illustrating an exemplary delay generator circuit in a second exemplary implementation in accordance with aspects of the present embodiment.

FIG. 6 is a circuit diagram illustrating a delay generator circuit 17 in a second exemplary implementation in accordance with aspects of the present embodiment. Aspects of the second exemplary implementation include a delay generator circuit 17 that limits the maximum value of the delay time to be generated. The delay generator circuit 17 is provided with a charging current controller 18 that controls the charging current supplied to the node N1, and a reference voltage generator 19 for generating the reference voltage Vr supplied to the minus-side input terminal of the comparator 13. Other portions of the configuration are substantially the same as the configuration of the delay generator circuit 11 in the first exemplary implementation. Portions of the configuration that are identical to those of delay generator circuit 11 in the first exemplary implementation are herein described using the same reference numbers.

The charging current controller 18 has substantially the same configuration as the configuration of the circuit that supplies charging current to the node N2 in the mono multivibrator circuit 6. The charging current controller 18 operates so as to increase the charging current supplied to the capacitor C1 when the input voltage Vin rises, and to decrease the charging current supplied to the capacitor C1 when the input voltage Vin falls.

In the reference voltage generator 19, the potential difference between the input voltage Vin and the output voltage Vout is divided by resistors R6 and R7, and the divided voltage is input into the minus-side input terminal of an amplifier 20. The input voltage Vin is input into the plus-side input terminal of the amplifier 20 via a resistor R8, while also being supplied to the drain of a transistor T9. The transistor T9 may be a n-channel MOS transistor, for example.

The output signal from the amplifier 20 is input into the gate of the transistor T9. A node N4 forms the source of the transistor T9, and is supplied with the output voltage Vout via a resistor R9. The node N4 is also connected to the minus-side input terminal of the comparator 13.

In the reference voltage generator 19, when the potential difference between the input voltage Vin and the output voltage Vout becomes large, the drain current from the transistor T9 increases, and the potential at the node N4 rises. When the potential difference between the input voltage Vin and the output voltage Vout becomes small, the drain current from the transistor T9 decreases, and the potential at the node N4 falls. The potential at the node N4 is expressed as R6/(R6+R7)* (Vin–Vout).

In the delay generator circuit 17, the maximum value of the delay time t1 is limited to (Vin–Vout)/Vin*Ts.

Exemplary Implementation 3

Figure 7:
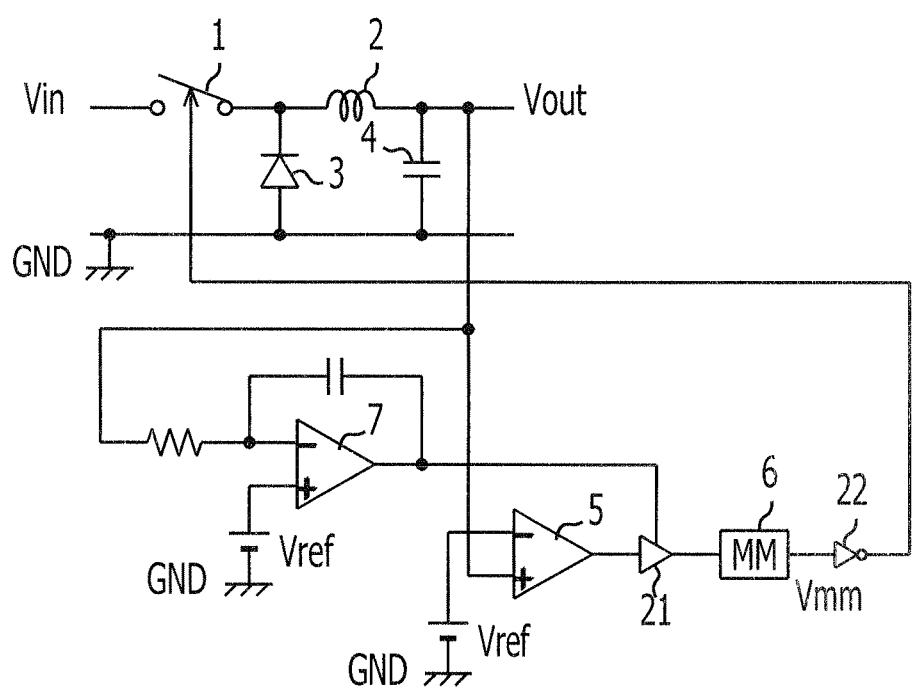
FIG. 7 is a circuit diagram illustrating an exemplary DC/DC converter in a third exemplary implementation in accordance with aspects of the present embodiment.
Figure 8:
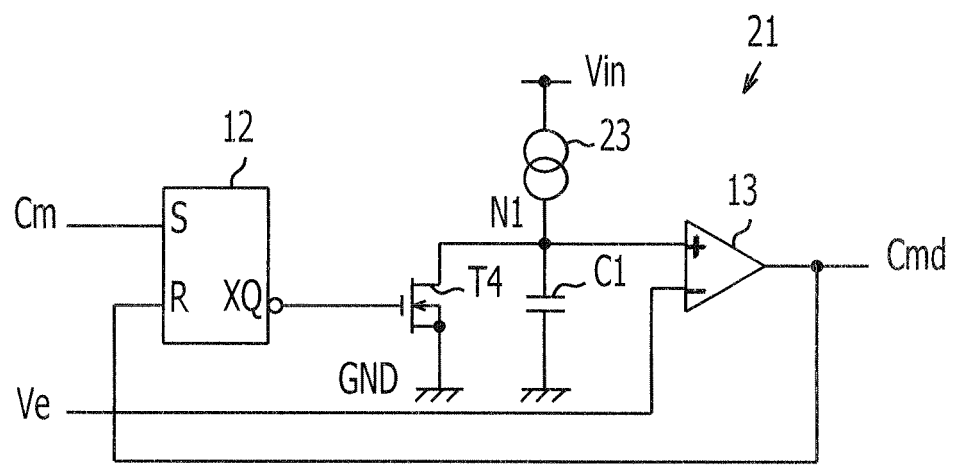
FIG. 8 is a circuit diagram illustrating an exemplary delay generator circuit in a third exemplary implementation in accordance with aspects of the present embodiment.
Figure 9:
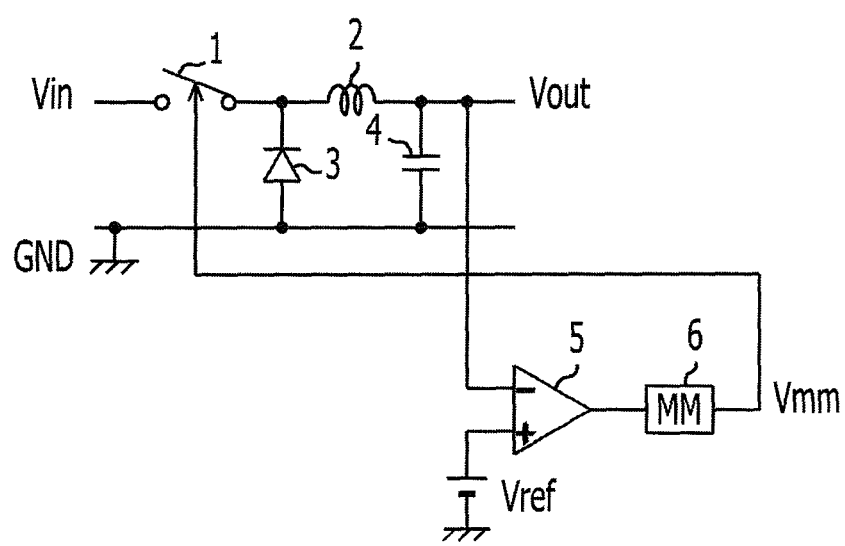
FIG. 9 is a circuit diagram illustrating a DC/DC converter.
Figure 10:
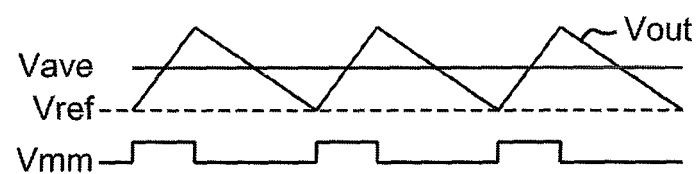
FIG. 10 is a timing waveform diagram illustrating the operation of a DC/DC converter.
Figure 11:
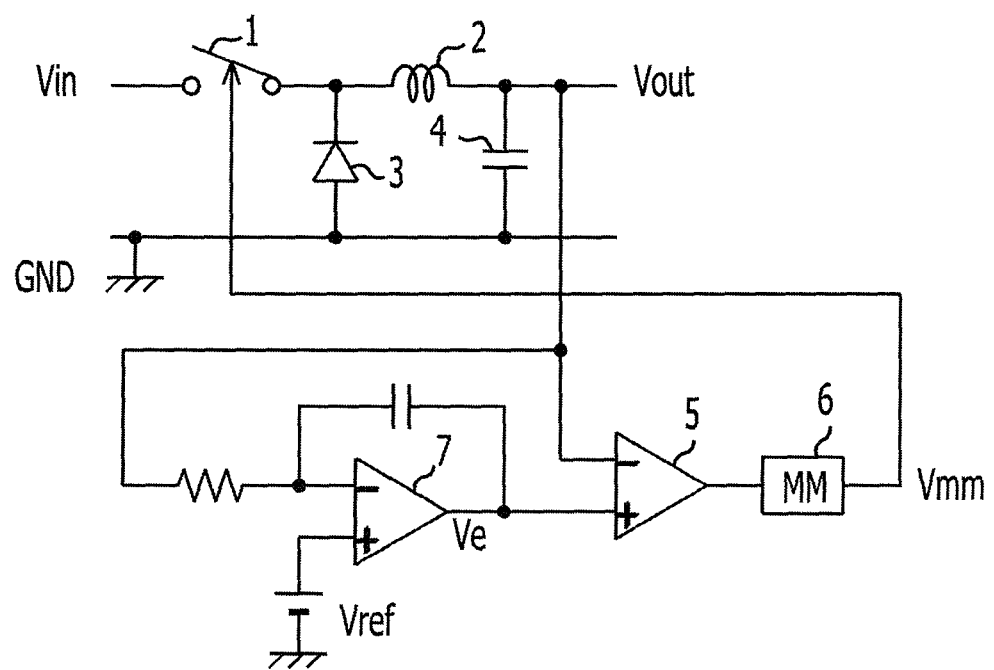
FIG. 11 is a circuit diagram illustrating a DC/DC converter.

FIG. 7 is a circuit diagram illustrating a DC/DC converter in a third exemplary implementation in accordance with aspects of the present embodiment. FIG. 8 is a circuit diagram illustrating a delay generator circuit in the third implementation. The third implementation includes a constant off-time DC/DC converter, wherein the time during which the switch circuit 1 is non-conducting is controlled by the mono multivibrator circuit 6.

A delay generator circuit 21 is interposed between the comparator 5 and the mono multivibrator circuit 6. The output signal Vmm from the mono multivibrator circuit 6 is inverted by an inverter circuit 22, and then input into the switch circuit 1. The output voltage Vout is input into the plus-side input terminal of the comparator 5, while the reference voltage Vref is input into the minus-side input terminal of the comparator 5. When the output voltage Vout goes higher than the reference voltage Vref, the output signal from the comparator 5 goes to H-level. Other aspects of the configuration are substantially the same configuration of the first exemplary implementation.

FIG. 8 is a circuit diagram illustrating a delay generator circuit in the third implementation. In the delay generator circuit 21 in the third implementation, a constant current is supplied to the capacitor C1 from a current source 23, and the output voltage Ve from the error amplifier 7 is input into the minus-side input terminal of the comparator 13. Other aspects of the configuration are substantially the same as the configuration of the delay generator circuit 21 in the first exemplary implementation.

In the delay generator circuit 21, when the output signal Cm from the comparator 5 goes to H-level, the transistor T4 is switched off, and the capacitor C1 is charged by the constant current supplied from the current source 23. When the potential at the node N1 goes higher than the output voltage Ve from the error amplifier 7, the output signal Cmd from the comparator 13 goes to H-level.

In so doing, the output signal XQ from the flip-flop circuit 12 goes to H-level, the transistor T4 is switched on, the electric charge of the capacitor C1 is absorbed, and the node N1 goes to approximately ground GND-level. Subsequently, when the output signal Cm from the comparator 5 goes to H-level, the above operation is repeated.

When the output voltage Ve from the error amplifier 7 rises, there is an increase in the delay time of the output signal Cmd from the comparator 13 with respect to the output signal Cm from the comparator 5. When the output voltage Ve from the error amplifier 7 falls, there is a decrease in the delay time of the output signal Cmd from the comparator 13 with respect to the output signal Cm from the comparator 5.

On the basis of the output signal Cmd from the delay generator circuit 21, a pulse signal is generated in the mono multivibrator circuit 6. The output signal Vmm is inverted by the inverter circuit 22 and supplied to the switch circuit 1. In so doing, it becomes possible to control the timing at which the switch circuit 1 is switched off by the output signal Vmm from the mono multivibrator circuit 6.

According to the third exemplary implementation, the timing at which the switch circuit 1 is switched off is controlled, and advantages similar to those of the first exemplary implementation can be obtained.

The delay generator circuits in the respective embodiments are configured to generate the delay time using a capacitor charging operation. However, the delay time may also be generated digitally by various means, such as by counting a clock signal in a counter circuit on the basis of the output signal from the comparator.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although aspects of the present inventions have been described in detail, it should be understood that the various changes, substitutions, and alterations could be made hereto without departing from the spirit and scope of the invention.

What is claimed is:

1. A DC/DC converter, comprising:
a first comparator configured to compare an output voltage to a reference voltage;
a pulse generator circuit configured to generate a pulse signal when triggered by an output signal from the first comparator;
a first switch circuit configured to open and close on the basis of the pulse signal;

an output voltage generator configured to generate the output voltage on the basis of an input voltage supplied via the first switch circuit;

a delay generator circuit positioned between the first comparator and the pulse generator circuit, the delay generator circuit being configured to delay the output signal from the first comparator before outputting the output signal from the first comparator to the pulse generator circuit; and an error amplifier configured to control a delay time of the delay generator circuit on the basis of a potential difference between the output voltage and the reference voltage.

2. The DC/DC converter according to claim 1, wherein the delay generator circuit includes:

a charging current controller configured to control a charging current on the basis of an output signal from the error amplifier;

a delay-setting unit configured to repeat a capacitor charging operation using the charging current from the charging current controller and configured to repeat a capacitor discharging operation, on the basis of the output signal from the first comparator; and a second comparator configured to compare the charging voltage of the capacitor to a reference voltage.

3. The DC/DC converter according to claim 2, wherein the delay generator circuit includes:

a charging current controller configured to add current to the charging current in accordance with the input voltage; and a reference voltage generator configured to generate a reference voltage that limits the delay time to a maximum delay time set by the delay-setting unit and configured to then output the reference voltage to the second comparator, on the basis of the potential difference between the input voltage and the output voltage.

4. The DC/DC converter according to claim 2, wherein the delay-setting unit includes:

a flip-flop circuit configured to receive the output signal from the first comparator at its set terminal and the output signal from the second comparator at its reset terminal; and a second switch circuit configured to open and close according to the output signal from the flip-flop circuit and to cause accumulated charge in the capacitor to be discharged when in the conducting state.

5. The DC/DC converter according to claim 1, wherein the pulse generator circuit causes the first switch circuit to enter a conducting state when triggered by a falling edge of the output signal from the first comparator.

6. The DC/DC converter according to claim 1, wherein the pulse generator circuit causes the first switch circuit to enter a non-conducting state when triggered by a rising edge of the output signal from the first comparator.

7. A DC/DC converter control method, comprising:

generating a pulse signal when triggered by a comparison result obtained by comparing an output voltage to a reference voltage;

opening or closing a switch circuit on the basis of the pulse signal; and generating the output voltage on the basis of an input voltage supplied via the switch circuit, wherein the pulse signal is generated using a delay signal that delays the comparison result on the basis of the potential difference between the output voltage and the reference voltage.

8. The DC/DC converter control method according to claim 7, wherein the switch circuit enters a conducting state when triggered by a falling edge of an output signal obtained by comparing the output voltage to the reference voltage.

9. The DC/DC converter control method according to claim 7, wherein the switch circuit enters a non-conducting state when triggered by a rising edge of an output signal obtained by comparing the output voltage to the reference voltage.

* * * * *